United States Patent [19]

Cheng et al.

[11] 4,316,772

[45] Feb. 23, 1982

[54] COMPOSITE MEMBRANE FOR A MEMBRANE DISTILLATION SYSTEM

[76] Inventors: Dah Y. Cheng, 12950 Cortez, Los Altos, Calif. 94022; Steve J. Wiersma, 658 Princeton Dr., Sunnyvale, Calif. 94087

[21] Appl. No.: 118,192

[22] Filed: Feb. 4, 1980

Related U.S. Application Data

[63] Continuation-in-part of Ser. No. 12,047, Feb. 14, 1979, Pat. No. 4,265,713.

[51] Int. Cl.³ ............................................. B01D 3/02
[52] U.S. Cl. ................................. 202/163; 210/500.2
[58] Field of Search ................. 210/321.1, 321.5, 640, 210/506, 644, 651–653, 500.2; 202/163, 172–174, 232, 267 R, 267 A, 270

[56] References Cited

U.S. PATENT DOCUMENTS

| | | | |
|---|---|---|---|
| Re. 27,982 | 4/1974 | Rodgers | 202/174 |
| B 317,624 | 1/1975 | Rodgers | 202/174 |
| 2,981,680 | 4/1961 | Binning | 210/640 |
| 2,984,623 | 5/1961 | Lee | 210/640 |
| 3,129,145 | 4/1964 | Hassler | 202/51 |
| 3,133,132 | 5/1964 | Loeb | 264/49 |
| 3,340,186 | 9/1967 | Weyl | 210/22 |
| 3,367,787 | 2/1968 | Thijssen | 99/199 |
| 3,405,058 | 10/1968 | Miller | 210/640 |
| 3,406,096 | 10/1968 | Rodgers | 202/172 |
| 3,562,116 | 2/1971 | Rodgers | 202/200 |
| 3,608,610 | 9/1971 | Greatorex | 159/13 |
| 3,620,895 | 11/1971 | Bailey | 161/123 |
| 3,642,668 | 2/1972 | Bailey | 260/2.5 M |
| 3,650,905 | 3/1972 | Rodgers | 203/10 |
| 3,661,721 | 5/1972 | Rodgers | 202/172 |
| 3,765,981 | 10/1973 | Rodgers | 156/210 |
| 3,896,004 | 7/1975 | Rodgers | 202/167 |

*Primary Examiner*—Frank Sever
*Attorney, Agent, or Firm*—Limbach, Limbach & Sutton

[57] ABSTRACT

A composite membrane separates a distilland and a distillate, such as salt water and fresh water. The composite membrane comprises a thin lyophobic microporous layer or membrane and a thin lyophilic layer or membrane on both sides of the lyophobic membrane or on the distillate side. Evaporation and condensation takes place within the micropores of the lyophobic membrane. The lyophilic layer on the distilland side prevents intrusion of distilland into the pores of the lyophobic layer. The lyophilic layer on the distillate side changes the surface curvature of the liquid/vapor interface in a manner which enhances the distillation rate through the membrane.

15 Claims, 3 Drawing Figures

COMPOSITE MEMBRANE FOR A MEMBRANE DISTILLATION SYSTEM

CROSS-REFERENCE TO RELATED APPLICATION

This is a continuation-in-part of U.S. Patent Application Ser. No. 012,047 entitled "Method and Apparatus for Distillation", filed Feb. 14, 1979, U.S. Pat. No. 4,265,713.

BACKGROUND OF THE INVENTION

The present invention relates to a method and apparatus for distillation and in particular, to one utilizing a composite membrane through which evaporation and condensation takes place.

Conventional distillation requires heating the distilland to the boiling point of one or more of the constituents of the distilland and then recovering and condensing the resulting vapor to a liquid, the distillate.

Distillation has also been accomplished through the use of a thin, porous, lyophobic membrane separating the distilland, typically an aqueous solution such as salt water, from the distillate, such as pure water.

The terms lyophobic and lyophilic are employed here to describe the wettability of a liquid on a solid surface. Lyophobic describes a non-wetting behavior of a liquid such that the contact angle between a liquid and a solid is greater than 90° so that the liquid tends to ball up and run off the surface easily. Lyophilic describes a wetting behavior of a liquid such that the contact angle between a liquid and a solid is less than 90° and the liquid spreads over the solid easily.

The contact angle or wettability depends on the relative attraction between the solid and liquid and between the molecules of the liquid themselves. If the attraction of the liquid for the solid is more than that for itself, the contact angle is less than 90° and wetting is said to occur and the liquid is said to be lyophilic with respect to the solid. A liquid is lyophobic with respect to a solid when the attraction of the liquid for the solid is less than that for itself thereby creating a contact angle greater than 90°.

When the liquid is water, the terms hydrophobic and hydrophilic are generally substituted for the more inclusive designations.

Due to the properties of the non-wetting lyophobic material at low pressures, liquid is prevented from entering within the pores of the lyophobic membrane. If the distilland has a higher equilibrium vapor pressure than the distillate, evaporation takes place at the hotter distilland side of the lyophobic pores and condensation occurs at the cooler, distillate liquid interface of the lyophobic membrane pores. Thus, in the case of the aqueous solution, in an effort to establish vapor pressure equilibrium, a net flux of water vapor thus passes through the pores of the hydrophobic membrane. One example of such thermal membrane distillation is described in U.S. Pat. No. 3,340,186.

This type of distillation process should be contrasted with reverse osmosis processes which also use porous membranes. Reverse osmosis does not involve an evaporation/condensation process. Thermal membrane distillation is an absolute filtration process where reverse osmosis is a relative filtration process.

Unfortunately, thermal distillation across a hydrophobic membrane has not been a practical approach for separating fresh water from salt water. This is due to a major problem called water-logging. Salt water migrates into the pores of the hydrophobic membrane and causes the fresh water and the salt water to make contact. In other words, the pores fill up with water thereby destroying the vapor barrier needed for the evaporation/condensation process. Patent Application Ser. No. 012,047 referenced above teaches that a lyophilic layer or membrane placed on the distilland side of the lyophobic membrane helps to prevent water-logging. A lyophobic membrane without a lyophilic layer on the distilland side can be used only for short term distillation applications as the water-logging phenomenon requires a period of time to develop and deteriorate the distillation production rates.

SUMMARY OF THE INVENTION

It is, therefore, an object of the invention to provide improved distillation production rates in thermal membrane distillation.

Another object of the invention is to provide improved thermal membrane distillation utilizing a composite membrane composed of lyophobic and multiple lyophilic layers.

Another object of the invention is to provide a multiple-layered membrane for thermal membrane distillation which has enhanced production rates.

In accordance with the present invention, thermal membrane distillation is accomplished using a composite membrane separating the distilland from the distillate. The composite membrane comprises a thin microporous lyophobic layer and one or two thin lyophilic layers, with the lyophilic layer adjacent to the distillate and either the lyophobic layer adjacent the distilland or a second lyophilic layer adjacent to the distilland with the lyophobic layer sandwiched between the two lyophilic layers.

In applications such as desalination of salt water, water-logging is prevented by the hydrophilic layer adjacent to the salt water, and continuous evaporation/condensation occurs within the pores of the hydrophobic layer. The hydrophilic layer adjacent to the fresh water increases the fresh water production rate when compared to similar systems with no hydrophilic layer adjacent to the distillate.

The proper selection of pore sizes for both the lyophobic and lyophilic layer(s) is important in maximizing the distillate production rate through the composite membrane for a given temperature and temperature difference. Generally, higher distillate production rates have been observed in composite membranes with the smaller pore sizes in the hydrophilic layers than in the hydrophobic layer, in the case of salt water distillation. Best results have occurred with the hydrophobic layer having a mean pore size of less than 0.5 $\mu$m diameter. Both hydrophilic layers, desirably, should also have a mean pore size of less than 0.5 $\mu$m in diameter. It has also been found that the hydrophilic layer(s) can be non-porous. Optimum pore sizes for systems designed for purposes other than water desalination may differ.

Examples of suitable porous hydrophobic materials for the composite membrane of the present invention include polytetrafluoro-ethylene (PTFE) such as DuPont's "Teflon" and polyvinylidene fluoride (PVF$_2$). Suitable hydrophilic materials include cellulose acetate, mixed esters of cellulose, polysulfone and polyallylamine. Other suitable porous hydrophobic and hydrophilic materials can also be used. The two hydrophilic layers may be of different materials.

PTFE is the most hydrophobic polymeric membrane material known. PVF$_2$ is somewhat less hydrophobic, but has also been shown to perform well.

The composite porous membrane can be formed by clamping the hydrophobic/hydrophilic layers closely together to form a cell with a suitable support backing to maintain the integrity of the composite membrane. In accordance with another aspect of the invention, the composite membrane is formed by coating the hydrophilic layers on the hydrophobic layer. For example, a hydrophobic membrane can be used as a substrate upon which a hydrophilic layer is formed on each side of the substrate.

DESCRIPTION OF THE PREFERRED EMBODIMENT

Figure 1:
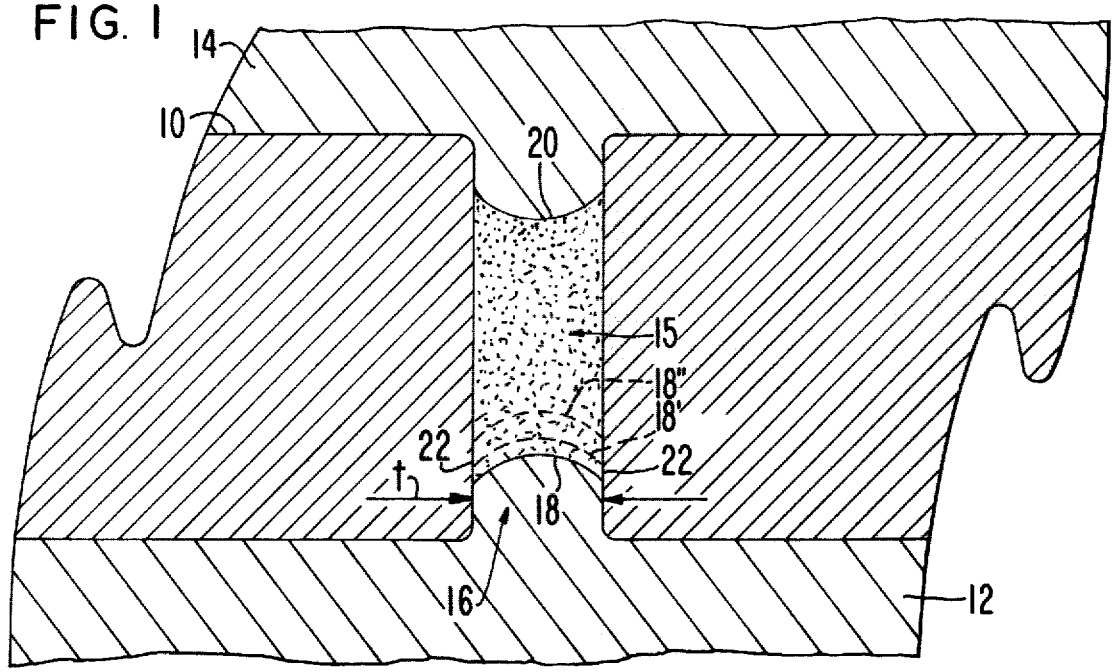
FIG. 1 is an enlarged sectional view of a conventional, single-layer, hydrophobic porous distillation membrane.

FIG. 1 is a sectional enlargement of a single hydrophobic membrane 10 separating a distilland 12 such as salt water, and a distillate 14 which is fresh water. A pore 16 extends across the hydrophobic membrane 10. Initially, due to the hydrophobic nature of the membrane 10, neither the salt water 12 nor fresh water 14 penetrates within the gaseous region 15 of pore 16. Two convex-shaped liquid-vapor surfaces 18 and 20 are defined at each end of pore 16.

Nonequal equilibrium states exist at the two interfaces 18 and 20 if the distilland 12 has a higher vapor pressure than the distillate 14. Pure water evaporates into the capillary pore 16 and the vapor is condensed at the vapor/liquid interface 20 on the distillate side 14 in an effort to establish local vapor pressure equilibrium. The result is the creation of a net flux of water vapor across the pore 16.

In distillation apparatus using the single hydrophobic membrane 10 of FIG. 1, after a period of time the vapor barrier across the pores is destroyed and hence the distillation process through the membrane, ceases. This is due to water-logging. The distilland liquid-vapor interface 18 migrates in a direction toward the distillate side 14, as indicated by 18' and 18", until eventually it intersects the liquid-vapor interface 20 on the distillate side of the membrane 10. This destroys the gaseous barrier needed for the distillation process to occur. A membrane structure for preventing the occurrence of water-logging is the subject of Patent Application Ser. No. 012,047 referenced above.

During distillation, for a given pressure, evaporation takes place at approximately a constant temperature. Addition of heat increases the kinetic energy of some liquid molecules enough to overcome the evaporation energy barrier. This heat is commonly known as the latent heat of evaporation. The latent heat of evaporation is a result of molecular attraction of the molecules which are tightly packed in the liquid phase. There is an energy barrier at the interface between the vapor and the liquid created by an unbalanced attracting surface force for vapor molecules onto the interface surface. The very short means free path (average molecular distance) on the liquid side compared with the vapor side creates the unbalanced forces at the interface. This is the phenomenon which creates surface tension. Condensation occurs when vapor molecules give up some of their kinetic energy and molecular attraction is sufficient to maintain the tightly packed structure of the liquid phase.

It is possible to change the evaporation or condensation energy barrier by changing the surface curvature at the liquid-vapor interface thereby changing the kinetic energy required of the water molecules to escape from the liquid into the vapor or be captured by the liquid from the vapor. For a convex liquid surface, the greater the convexity, the greater the evaporation rate for a given temperature. Further, a convex liquid surface will have a greater rate of evaporation than a concave liquid surface. Conversely, the rate of condensation is less on a convex liquid surface than on a concave liquid surface. And the greater the concavity, the greater the condensation rate for a given temperature.

The effect of the degree of curvature on evaporation rates can be seen in the formation of water droplets at a given temperature. Small drops, having greater curvatures, require higher vapor partial pressure to reach equilibrium with the surrounding gas mixture. As an example, the distribution of different drop sizes existing in a cloud formation of cloud chamber will shift to larger drop sizes with time. The bulk temperature and vapor pressure is the same for all sizes of droplets. Due to the required higher equilibrium vapor partial pressure for small drops, they will evaporate to increase the bulk vapor pressure of the surrounding gas mixture. This, however, causes a condensation to take place on the larger drops since their equilibrium vapor partial pressure is lower, due to their "flatter" outside curvature.

For a period of time the smaller sized drops disappear and the large sized drops become larger. In a rain cloud, as the size of a drop increases, the gravitational force becomes larger than the air current buoyancy forces and rainfall begins.

Patent Application Ser. No. 012,047 shows how a hydrophilic layer located between the salt water and the hydrophobic membrane prevents water-logging in the hydrophobic membrane pores by modifying the liquid-vapor interface which changes the rate of evaporation and prevents salt precipitation at the hydrophobic wall which eventually allows water-logging to occur.

In accordance with the present invention a hydrophilic layer is placed between the hydrophobic membrane and the distillate water. This hydrophilic layer modifies this vapor-liquid interface in such a way that the energy potential gradient for condensation is increased thereby increasing the condensation rate. It is believed that the liquid/vapor interface becomes less convex and more concave. The overall effect of the addition of the hydrophilic layer on the distillate water side of the composite membrane in the distillation apparatus is to increase the rate of production of distillate at a given temperature.

Figure 2:
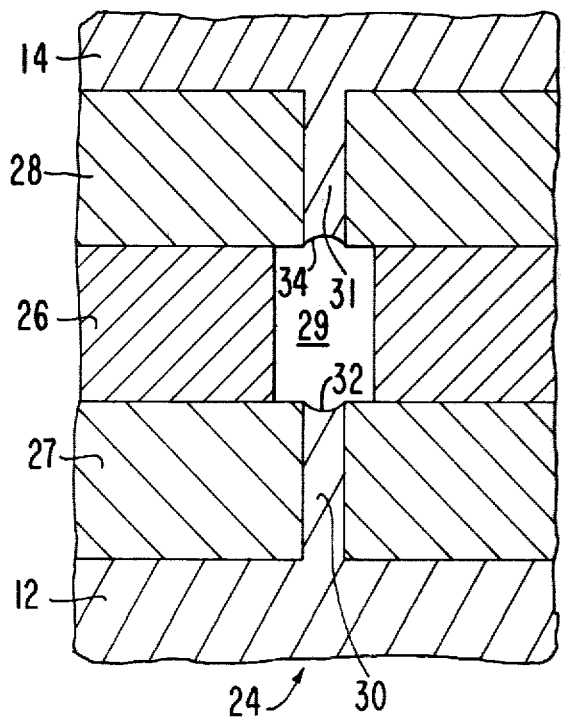
FIG. 2 is an enlarged sectional view of a composite hydrophilic/hydrophobic/hydrophilic membrane in accordance with the present invention.

FIG. 2 is an enlarged sectional view of a composite porous membrane 24 for thermal membrane distillation, in accordance with the present invention. The composite membrane 24 comprises a hydrophobic layer 26 to which is closely joined hydrophilic layers 27 and 28. The membranes must be pressed together or joined closely enough to alter the surface tension effect at the salt water/water vapor interface and at the water vapor/pure water interface. The hydrophilic layer 27 is adjacent the distilland 12 and the hydrophilic layer 28 is adjacent the distillate 14. In the embodiment described, the distilland is salt water and the distillate is fresh water.

As with the single hydrophobic distillation membrane 10 of FIG. 1, evaporation and condensation take place within micropores 29. The hydrophilic layers 27 and 28 can also be microporous, but because of the affinity of water to the hydrophilic material, the pores 30 and 31 of the hydrophilic layers 27 and 28 fill by capillary action with water. With a vapor pressure gradient across the composite membrane 24 a net evaporation takes place at the salt water/vapor interface 32 and a net condensation occurs at the fresh water/vapor interface 34. It is not a requirement that where the hydrophilic layers are porous, that the pores be aligned with the hydrophobic pores, as shown in FIG. 2. Accordingly, the hydrophilic layer 27 may be a different material than hydrophilic layer 28.

The vapor transport rate across the pores 29 is dependent on the vapor pressure gradient across the pore cavity, i.e., on the vapor pressure difference at the evaporating liquid/vapor interface 32 and the condensing vapor/liquid interface 34. The vapor pressure is a function of the temperature, salt concentration, and surface curvature. Therefore, all three properties must be considered in creating the desired vapor pressure gradient across the composite membrane 24.

The proper selection of pore sizes for the hydrophobic and hydrophilic layers of the composite membrane is important for maximizing distillate production and insuring uninterrupted flow. The pore sizes of the hydrophobic layer should be chosen to withstand at least the hydraulic pressure exerted by the liquids on either side of the membrane. That is, the bubble pressure across the hydrophobic layer must exceed, at a minimum, the absolute hydraulic pressure. The vapor pressure in the pore may be much lower than atmospheric pressure, therefore the bubble pressure must exceed the absolute hydraulic pressure rather than simply the gauge hydraulic pressure.

Bubble pressure is defined as the required pressure to overcome the capillary surface tension. This is directly related to pore diameter. Since the porous hydrophobic material has a distribution of pore diameters, the maximum absolute pressure on either side of the hydrophobic membrane must not exceed the bubble pressure for the largest pores. Because capillary forces are greater for smaller pores, bubble pressure increases as pore size decreases.

Best results have been obtained with mean pore size for the hydrophobic layer of less than 0.5 μm for PTFE for desalination of salt water. Preferably, the mean pore size of both hydrophilic layers 27 and 28 are smaller than the mean pore size of the hydrophobic layer 26. Generally, best results have been obtained with mean pore size less than 0.5 μm for the hydrophilic layers as well. The important objective of selecting the hydrophilic layer pore sizes is to alter the liquid-gas interface 32 at the pores 29 of the hydrophobic layer to prevent migration of the distilland into the hydrophobic pores to prevent water-logging and to alter the gas-liquid interface 34 to form a non-convex surface and thereby enhance the condensation rate.

The composite membrane should be made as thin as possible so that the vapor transport distance across the membrane is as short as possible. A practical limitation on thinness is that it must be sufficiently strong that it doesn't tear or rupture. Typical thicknesses for the hydrophobic layer are about 1.5 mils for PTFE and about 2 to 6 mils for $PVF_2$.

Figure 3:
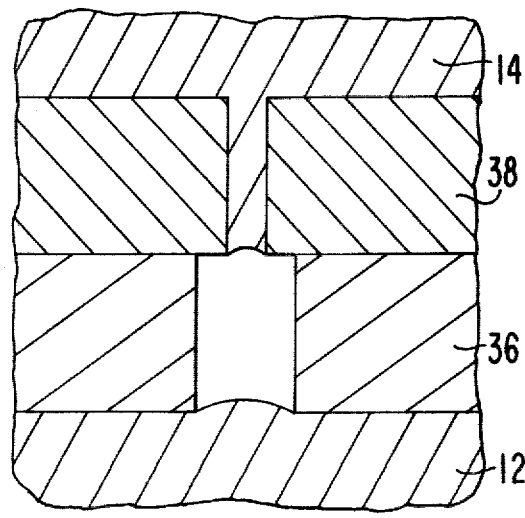
FIG. 3 is an enlarged sectional view of a composite hydrophobic/hydrophilic membrane in accordance with the present invention.

FIG. 3 is an enlarged sectional view of a second configuration of the present invention. This composite membrane comprises a hydrophobic layer 36 to which is closely joined a hydrophilic layer 38. The membranes are pressed together or joined closely enough to alter the surface tension effect at the water vapor/pure water interface. The hydrophobic layer 36 is adjacent to the distilland 12 and the hydrophilic layer 28 is adjacent to the distillate 14. In the embodiment described, the distilland is salt water and the distillate is fresh water.

In FIG. 3 the hydrophilic layer 38 performs the same function as the hydrophilic layer 28 in the FIG. 2 configuration.

EXAMPLE

A composite membrane structure consisting of a hydrophilic layer—hydrophobic membrane—hydrophilic layer was used in a thermal distillation apparatus. The hydrophobic membrane material was $PVF_2$ and the maximum hydrophobic pore diameter was 0.48 μm. Distillation rate or fresh water production rate for a distilland bulk temperature of 145° F. and a distillate temperature of 134° F. was 15.4 pounds of fresh water distillate per day per square foot of composite membrane area.

A composite membrane of similar structure except with no hydrophilic layer on the distillate side of the hydrophobic membrane yielded a fresh water production rate of 10.5 pounds of distillate per day per square foot of composite membrane area for the same distilland and distillate temperature conditions. Therefore, the addition of the hydrophilic layer of the distillate side of the hydrophobic membrane increased the fresh water production rate by almost 50%.

What is claimed is:
1. Thermal membrane distillation apparatus for separating pure water from an aqueous solution comprising:
   a composite membrane separating an aqueous solution to be purified from purified water;
   said composite membrane comprising a thin porous hydrophobic layer sandwiched between two thin hydrophilic layers; and,
   means for providing a sufficient temperature differential across said composite membrane so that liquid water evaporates on the aqueous solution side of the pores of the hydrophobic layer and condenses as pure water on the pure water side of the pores of the hydrophobic layer.

2. Apparatus as in claim 1 wherein at least one of said hydrophilic layers is porous.

3. Apparatus as in claim 2 wherein the mean pore diameter of the hydrophilic layers is less than the mean pore diameter of the hydrophobic layer.

4. Apparatus as in claim 3 wherein the hydrophobic layer is polytetrafluoro-ethylene.

5. Apparatus as in claim 3 wherein the hydrophobic layer is polyvinylidene fluoride.

6. Apparatus as in claim 2 or 5 wherein at least one of the hydrophilic layers is cellulose acetate/cellulose nitrate.

7. Apparatus as in claim 2 or 5 wherein at least one of the hydrophilic layers is cellulose acetate.

8. Apparatus as in claim 2 or 5 wherein at least one of the hydrophilic layers is polysulfone.

9. Apparatus as in claim 2 or 5 wherein at least one of the hydrophilic layers is polyallylamine.

10. Apparatus as in claim 2 or 5 wherein the average pore size diameter of the hydrophilic layers is less than 0.5 μm.

11. Apparatus as in claim 1 wherein the average pore size diameter of the hydrophobic layer is less than 0.5 μm.

12. Apparatus as in claim 1 wherein at least one of said hydrophilic layers is non-porous.

13. In an improved thermal membrane distillation apparatus comprising a porous lyophobic membrane separating a distilland from a distillate, wherein evaporation and condensation occurs through the pores of the lyophobic membrane when the temperature of the distilland is elevated sufficiently above that of the distillate to create a vapor pressure gradient from the distilland to the distillate, and wherein the improvement comprises the addition of a lyophilic layer on each side of the lyophobic membrane.

14. The improved thermal membrane distillation apparatus of claim 13 wherein said lyophilic layers are porous.

15. The improved thermal membrane distillation apparatus of claim 13 wherein said lyophilic layers are non-porous.

* * * * *